US007262588B2

(12) United States Patent
Matsuo et al.

(10) Patent No.: US 7,262,588 B2
(45) Date of Patent: Aug. 28, 2007

(54) METHOD AND APPARATUS FOR POWER SUPPLY CONTROLLING CAPABLE OF EFFECTIVELY CONTROLLING SWITCHING OPERATIONS

(75) Inventors: Masahiro Matsuo, Hyogo-ken (JP); Tomonari Katoh, Osaka-fu (JP)

(73) Assignee: Ricoh Company, Ltd. (JP)

( * ) Notice: Subject to any disclaimer, the term of this patent is extended or adjusted under 35 U.S.C. 154(b) by 344 days.

(21) Appl. No.: 10/995,300

(22) Filed: Nov. 24, 2004

(65) Prior Publication Data
US 2005/0116697 A1  Jun. 2, 2005

(30) Foreign Application Priority Data
Nov. 27, 2003  (JP)  ............... 2003-397683

(51) Int. Cl.
G05F 1/40  (2006.01)
(52) U.S. Cl. ..................................... 323/282
(58) Field of Classification Search ................ 323/282, 323/283, 284, 351
See application file for complete search history.

(56) References Cited

U.S. PATENT DOCUMENTS

| 6,104,057 | A | 8/2000 | Nakanishi et al. |
| 6,115,292 | A | 9/2000 | Fukuda et al. |
| 6,335,883 | B1 | 1/2002 | Fukuda et al. |
| 6,366,066 | B1 * | 4/2002 | Wilcox ........................ 323/282 |
| 6,456,050 | B1 * | 9/2002 | Agiman ....................... 323/282 |
| 6,545,916 | B2 | 4/2003 | Fukuda et al. |
| 6,713,992 | B2 | 3/2004 | Matsuo et al. |
| 7,031,175 | B2 * | 4/2006 | Dequina et al. ............ 363/127 |
| 7,138,786 | B2 * | 11/2006 | Ishigaki et al. ............. 323/224 |
| 2003/0128489 | A1 | 7/2003 | Katoh et al. |
| 2003/0210588 | A1 | 11/2003 | Fukuda et al. |
| 2004/0051509 | A1 | 3/2004 | Matsuo et al. |
| 2004/0104715 | A1 | 6/2004 | Manabe et al. |
| 2004/0105198 | A1 | 6/2004 | Fujii |
| 2004/0113495 | A1 | 6/2004 | Matsuo et al. |
| 2005/0258811 | A1 * | 11/2005 | Matsuo et al. .............. 323/282 |
| 2006/0273767 | A1 | 12/2006 | Fujii |

FOREIGN PATENT DOCUMENTS

JP  2000-217344  8/2000

* cited by examiner

*Primary Examiner*—Adolf Berhane
(74) *Attorney, Agent, or Firm*—Dickstein Shapiro LLP

(57) ABSTRACT

A switching regulator includes a first switching element to perform a switching operation in accordance with a first control signal input thereto to control an output voltage based on an input voltage, a second switching element having a size smaller than the first switching element to perform a switching operation in accordance with one of the first control signal and a second control signal input thereto to control an output voltage based on the input voltage, and a control circuit to control the first and second switching elements to perform the switching operations in one of a normal operation mode and a light load operation mode in which a current consumed by a load connected to the switching regulator is smaller than a current consumed in the normal operation mode, and control the first switching element to be turned off in the light load operation mode.

45 Claims, 5 Drawing Sheets

METHOD AND APPARATUS FOR POWER SUPPLY CONTROLLING CAPABLE OF EFFECTIVELY CONTROLLING SWITCHING OPERATIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

The present application claims priority to Japanese patent application, No. JPAP 2003-397683 filed on Nov. 27, 2003, the entire contents of which are incorporated by reference herein.

1. Field of the Invention

The present invention relates to a method and apparatus for power supply controlling. In particular, the present invention relates to a method and apparatus for power supply controlling capable of effectively controlling switching operations.

2. Description of the Related Art

In recent years, energy saving has strongly been demanded for environmental reasons. In a portable information handling apparatus using batteries, such as a cellular phone, mobile personal information terminal, digital camera, laptop personal computer, and so forth, a reduction of power consumption used in the above-described apparatus becomes more and more important, for example, to make the batteries last longer. As a result, a non-insulative step-down switching regulator is widely used as a power supply circuit. The non-insulative step-down switching regulator, which is hereinafter referred to as a "switching regulator", employs an inductor and is highly efficient and downsizable.

However, while being highly efficient in a rated load, the switching regulator consumes a relatively large amount of power for driving itself, resulting in a significantly low efficiency when an apparatus is in a mode consuming lower power than in a normal operation mode. The mode consuming lower power is referred to as a "light load operation mode", representing a stand-by mode and a sleep mode.

To increase efficiency of the above-described operation in the light load operation mode, some techniques have been proposed.

Referring to FIG. 1, a structure of a background circuit of a switching power supply circuit 101 employing one of these techniques is described. The technique uses a transistor having a short switching period in the light load mode to increase power supply efficiency in the light load operation mode. By using the above-described technique, the switching power supply circuit 101 may reduce power to be used in a transition period in which a switching element changes its status from power on to power off or from power off to power on.

Details of components provided in the switching power supply circuit 101 will be described.

In FIG. 1, the switching power supply circuit 101 includes a switching circuit 102, an outputting circuit 103 and a control circuit 104.

The switching circuit 102 includes a normal switching element 102a having a NPN-type (negative-positive-negative-type) transistor and a light load switching element 102b having a NPN-type transistor. The normal switching element 102a and the light load switching element 102b are connected in parallel between a collector serving as an input terminal E and an emitter serving as an output terminal B of the switching circuit 102.

The normal switching element 102a generates an applicable current in the normal operation mode. The light load switching element 102b generates a current having an amount smaller than that of the normal switching element 102a and has a switching time period shorter than that of the normal switching element 102a. The switching power supply circuit 101 drives the normal switching element 102a in the normal operation mode, and the light load switching element 102b in the light load operation mode, so that the above-described switching operations of the normal switching element 102a and the light load switching element 102b may convert a direct current voltage output by a direct current power supply 105 to a predetermined pulse to be output.

The outputting circuit 103 smoothes the predetermined pulse output by the switching circuit 102 and includes a diode 103a, coil 103b and a smoothing capacitor 103c. The diode 103a has an anode connected to the output terminal B on an output line of the switching circuit 102 and a cathode connected to a ground voltage. The coil 103b is connected on the output line of the switching circuit 102, between the cathode of the diode 103a and an input terminal C of a load current detection circuit 104f, which will be described below. The smoothing capacitor 103c has two electrodes on the output line of the switching circuit 102, one of which is connected to an output terminal D of the load current detection circuit 104f and the other is connected to a ground voltage.

The control circuit 104 feeds back a direct current voltage output from the outputting circuit 103, and controls a duty of the switching operations of the switching circuit 102 to stabilize the direct current voltage. The control circuit 104 also determines whether an operation mode of an apparatus is the normal operation mode or the light load operation mode to perform the switching operations of the switching circuit 102. That is, the control circuit 104 controls the switching operations between the normal switching element 102a and the light load switching element 102b of the switching circuit 102.

The control circuit 104 includes a differential amplifier 104a, reference voltage source 104b, PWM (pulse width modulation) comparator 104c, an oscillator 104d, a switching board 104e and the load current detection circuit 104f.

The differential amplifier 104a includes a non-inverting input terminal and an inverting input terminal. The non-inverting input terminal of the differential amplifier 104a is connected to an output line of the outputting circuit 103 and the inverting input terminal of the differential amplifier 104a is connected to a positive terminal of the reference voltage source 104b. A direct current voltage is generated between the reference voltage source and a ground voltage.

The PWM comparator 104c includes a non-inverting input terminal and an inverting input terminal. The non-inverting input terminal of the PWM comparator 104c is connected to an output terminal of the differential amplifier 104a. The inverting input terminal of the PWM comparator 104c is connected to an output terminal of the oscillator 104d that generates a triangular wave according to a predetermined frequency.

The switching board 104e includes two input terminals and two output terminals. One of the input terminals of the switching board 104e is connected to the output terminal of the PWM comparator 104c and the other input terminal, which is input terminal A, is connected to an output terminal of the load current detection circuit 104f. One of the output terminals of the switching board 104e is connected to a base of the normal switching element 102a and the other is connected to a base of the light load switching element 102b.

The load current detection circuit 104f is connected between the coil 103b and the smoothing capacitor 103c of the outputting circuit 103. An output terminal of the load current detection circuit 104f, that outputs a detection result of a load current of an electric load 106, is connected to the input terminal A of the switching board 104e.

Operations of the above-described switching power supply circuit 101 are now described.

When the direct current voltage output by the direct current source 105 is applied to the switching circuit 102 in the normal operation mode while the electric load 106 is connected, a base current generated according to the predetermined frequency is supplied to the normal switching element 102a, the normal switching element 102a performs the switching operations and outputs a pulse to the outputting circuit 103. At this time, the bias current is not supplied to the light load switching element 102b, so that the light load switching element 102b remains inactive.

While the normal switching element 102a is activated, the outputting circuit 103 allows a passage of a current according to a voltage output by the normal switching element 102a, and stores energy in the coil 103b. When the normal switching element 102a turns off, the energy stored in the coil 103b is discharged through the diode 103a. The discharged energy is smoothed by the smoothing capacitor 103c through one cycle of the pulse so that the direct current voltage may be obtained to supply to the electric load 106.

The direct current voltage output by the outputting circuit 103 is input to the differential amplifier 104a of the control circuit 104. The differential amplifier 104a amplifies a difference between the direct current voltage and a voltage obtained by the reference voltage source 104b, and outputs a result of the amplification to the PWM comparator 104c. The triangular wave according to the predetermined frequency generated by the oscillator 104d is input to the PWM comparator 104c. The PWM comparator 104c synchronizes a difference output by the differential amplifier 104a and the triangular wave so as to generate a pulse having a duty according to the difference between the direct current voltage and the voltage obtained by the reference voltage source 104b and outputs the pulse to the switching board 104e. A signal indicating that the load current is in the normal operation is input to the switching board 104e from the load current detection circuit 104f. The switching board 104e selects the output line connected to the normal switching element 102a to supply the base current to the normal switching element 102a with the duty of the pulse output from the PWM comparator 104c.

The normal switching element 102a reduces the duty when the direct current voltage output by the outputting circuit 103 is higher than a predetermined value and increases the duty when the direct current voltage is lower than the predetermined value, thereby stabilizing the direct current voltage to the predetermined value.

When the electric load 106 changes the status to the light load operation mode such as the standby mode, the load current of the electric load 106 reduces. At this time, the load current detection circuit 104f outputs a signal indicating that the load current is in the light load operation. The switching board 104e selects the output line connected to the light load switching element 102b to supply the base current to the light load switching element 102b with the duty of the pulse output from the PWM comparator 104c.

Since the light load switching element 102b performs the switching operations in a period shorter than the normal switching element 102a, a power loss due to switching operations may become lower in the light load operation than in the normal operation. When the switching power supply circuit 101 turns to the normal operation again, the normal switching element 102a is reactivated.

As previously described, a NPN-type transistor is used for the normal operation switching element 102a and the light load switching element 102b in the switching power supply circuit 101 of FIG. 1. As an alternative, a MOSFET (metal oxide semiconductor field effect transistor) may be used for the normal operation switching element 102a and the light load switching element 102b, and such technique using the MOSFET as switching elements has also been proposed.

As described above, a switching element having a switching time period shorter than that in the light load operation may be effectively used to reduce the power loss in transition of the switching operation. However, since a power consumed in the switching element is a product of a current in the switching element and a voltage applied to the switching element, the current in the switching element is extremely small in the light load operation, especially in the standby mode. In particular, the current flowing in the switching element is in a range from some $\mu A$ to some hundred $\mu A$, thereby effect on the power loss may be small.

A large amount of power consumption in the light load operation is power consumed to charge and discharge a parasitic capacitance as a drive pulse existing between a control electrode and input and output terminals of the switching element. In a MOS (metal oxide semiconductor) transistor, for example, the parasitic capacitance may exist between a point of a gate and a source of the MOS transistor and a point of the gate and a drain of the MOS transistor.

The power is free from the current in the switching element and remains constant. To reduce the power loss caused by charging and discharging such parasitic capacitance, it is effective to reduce the driving frequency of the switching element.

To achieve the above-described purpose, one technique is used in which a switching frequency is changed to a lower level. In this technique, however, the switching frequency may have a limitation to be reduced no lower than 20 kHz. The frequency below 20 kHz enters an audio frequency band, which gives offensive sound. There is another technique in which the switching operation is intermittently performed. The intermittent switching operation, however, may generate an output voltage having a ripple that needs to be avoided. Furthermore, there is another technique in which a normal switching operation is stopped to drive a series regulator that operates using a current with low power consumption. However, the series regulator includes a voltage control transistor that causes power loss. Even though the series regulator effectively works when a load current in the light load mode is small, the efficiency may become smaller when the load current in the light load mode becomes larger. In addition, a size of the series regulator may cause another problem since adding the series regulator may need a larger scale of a circuit.

BRIEF SUMMARY OF THE INVENTION

The present invention has been made in view of the above-described circumstances.

An object of the present invention is to provide a novel switching regulator for power supply controlling capable of effectively controlling operations of switching transistors to minimize power consumption of the switching regulator due to charging and discharging operations of parasitic capacitances.

Another object of the present invention is to provide a novel method of switching using the above-described switching regulator.

A novel switching regulator includes first and second switching elements and a control circuit. The first switching element is configured to perform a switching operation in accordance with a first control signal input thereto to control an output voltage based on an input voltage. The second switching element has a size smaller than the first switching element and is configured to perform a switching operation in accordance with one of the first control signal and a second control signal input thereto to control an output voltage based on the input voltage. The control circuit is configured to control the first and second switching elements to perform the switching operations in one of a normal operation mode and a light load operation mode in which a current consumed by a load connected to the switching regulator is smaller than a current consumed in the normal operation mode. The control circuit may control the first switching element to be turned off in the light load operation mode.

The second switching element may produce between electrodes thereof parasitic capacitances smaller than parasitic capacitances of the first switching element. The second switching element may also have an impedance higher than an impedance of the first switching element when the second switching element is turned on.

The control circuit may control the first and second switching elements to be turned on together in the normal operation mode.

The novel switching regulator may further include an inductor and a third switching element. The inductor is configured to store an energy generated by a current flowing through the inductor and associated with the output voltage supplied by the first and second switching elements. The third switching element has a parasitic diode between input and output electrodes thereof, and is serially connected with the first switching element. The third switching element is configured to discharge the energy stored in the inductor. The control circuit may control the third switching element to perform a reverse operation relative to the switching operation of the first switching element in the normal operation mode, and to be turned off together with the first switching element to cause the parasitic diode to act as a flywheel diode in the light load operation mode.

The novel switching regulator may further include an overshoot protecting circuit configured to detect the current flowing through the first and second switching elements, to cause the control circuit to turn off the first switching element when the current exceeds a threshold value, and to terminate in the light load operation mode.

The control circuit may include first and second modulation controllers and a first switching circuit. The first modulation controller may be configured to perform pulse width modulation control with respect to the first and third switching elements. The second modulation controller may be configured to perform pulse frequency modulation control with respect to the second switching element. The first switching circuit may be configured to select one of the first control signal derived from the first modulation controller to change the operation mode to the normal operation mode and the second control signal derived from the second modulation controller to change the operation mode to the light load operation mode, so as to be output to the second switching element.

The second modulation controller may be configured to activate in the light load operation mode and to terminate in the normal operation mode.

The first modulation controller may be configured to activate in the normal operation mode and to terminate in the light load operation mode.

The novel switching regulator may further include a first oscillating circuit configured to generate a pulse signal according to a predetermined frequency. The second modulation controller may generate a predetermined pulse, during the pulse width modulation control, based on a pulse train output by the first oscillating circuit in accordance with the predetermined voltage output to the electric load, and output the predetermined pulse to the second switching element.

The first and second switching elements and the control circuit may be integrated into a single integrated circuit.

The first and second switching elements, the control circuit and the overshoot protecting circuit may be integrated into a single integrated circuit.

The control circuit may include third and fourth modulation controllers and a second switching circuit. The third modulation controller may be configured to perform pulse width modulation control with respect to the first and third switching elements. The fourth modulation controller may be configured to perform pulse frequency modulation control with respect to the second switching element in the light load operation mode and to stop the pulse frequency modulation control in the normal operation mode. The second switching circuit may be configured to determine whether a control signal derived from the third modulation controller is output to the second switching element in the normal operation mode.

The third modulation controller may be configured to activate in the normal operation mode and to terminate in the light load operation mode.

The novel switching regulator may further include a second oscillating circuit configured to generate a pulse signal according to a predetermined frequency. The fourth modulation controller may generate a predetermined pulse, during the pulse width modulation control, based on a pulse train output by the second oscillating circuit in accordance with the predetermined voltage output to the load, and output the predetermined pulse to the second switching element.

A novel method of switching includes the steps of providing a first switching element in a switching regulator, providing a second switching element having a size smaller than the first switching element, in the switching regulator, receiving a switching signal, generating a control signal in accordance with the switching signal, sending the control signal to the first and second switching elements, controlling the first switching element to be turned off when a light load operation mode is selected, and controlling the second switching element to be turned on when the light load operation modes are selected.

The controlling step may control the first and second switching elements to be turned on in a normal operation mode.

The novel method may further include the steps of storing an energy generated by a current flowing by the storing and associated with an output voltage supplied by the first and second switching elements, providing a third switching element having a parasitic diode between input and output electrodes thereof, and controlling the third switching element to perform a reverse operation relative to the switching operation of the first switching element in the normal operation mode and to be turned off together with the first switching element to cause the parasitic diode to act as a flywheel diode in the light load operation mode.

The novel method may further include the steps of detecting the current supplied by the first and second switching elements, and causing the first switching element to be turned off when the current exceeds a threshold value in the normal operation mode.

The causing step may be terminated in the light load operation mode.

The generating step may include the steps of performing pulse width modulation control with respect to the first and third switching elements, conducting pulse frequency modulation control with respect to the second switching element, and allowing the control signal sent by the sending step to pass through a selectable gate to the second switching element.

The conducting step may activate in the light load operation mode and terminate in the normal operation mode.

The performing step may activate in the normal operation mode and terminate in the light load operation mode.

The novel method may further include the step of forming a pulse signal according to a predetermined frequency. The conducting step may generate a predetermined pulse, during the pulse width modulation control, based on a pulse train output by the forming step, and output the predetermined pulse to the second switching element.

The generating step may include the steps of performing pulse width modulation control with respect to the first and third switching elements, conducting pulse frequency modulation control with respect to the second switching element in the light load operation mode, terminating the pulse frequency modulation control in the normal operation mode, and determining the control signal derived from the performing step is output to the second switching element in the normal operation mode.

The performing step may activate in the normal operation mode and terminate in the light load operation mode.

A novel power supply method, comprising the steps of providing a first switching element, providing a second switching element having a size smaller than the first switching element, receiving a mode selection signal, changing an operation mode to one of a normal operation mode and a light load operation mode in accordance with the mode selection signal, generating a first control signal in accordance with the mode selection signal, generating a second control signal in accordance with the mode selection signal, sending the first control signal to the first and second switching elements in the normal operation mode, sending the second control signal to the second switching element in the light load operation mode, detecting an output signal derived from outputs of the first and second switching elements in the normal operation mode, comparing the output signal with a reference signal, and adjusting the outputs of the first and second switching elements according to a result of the comparison.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
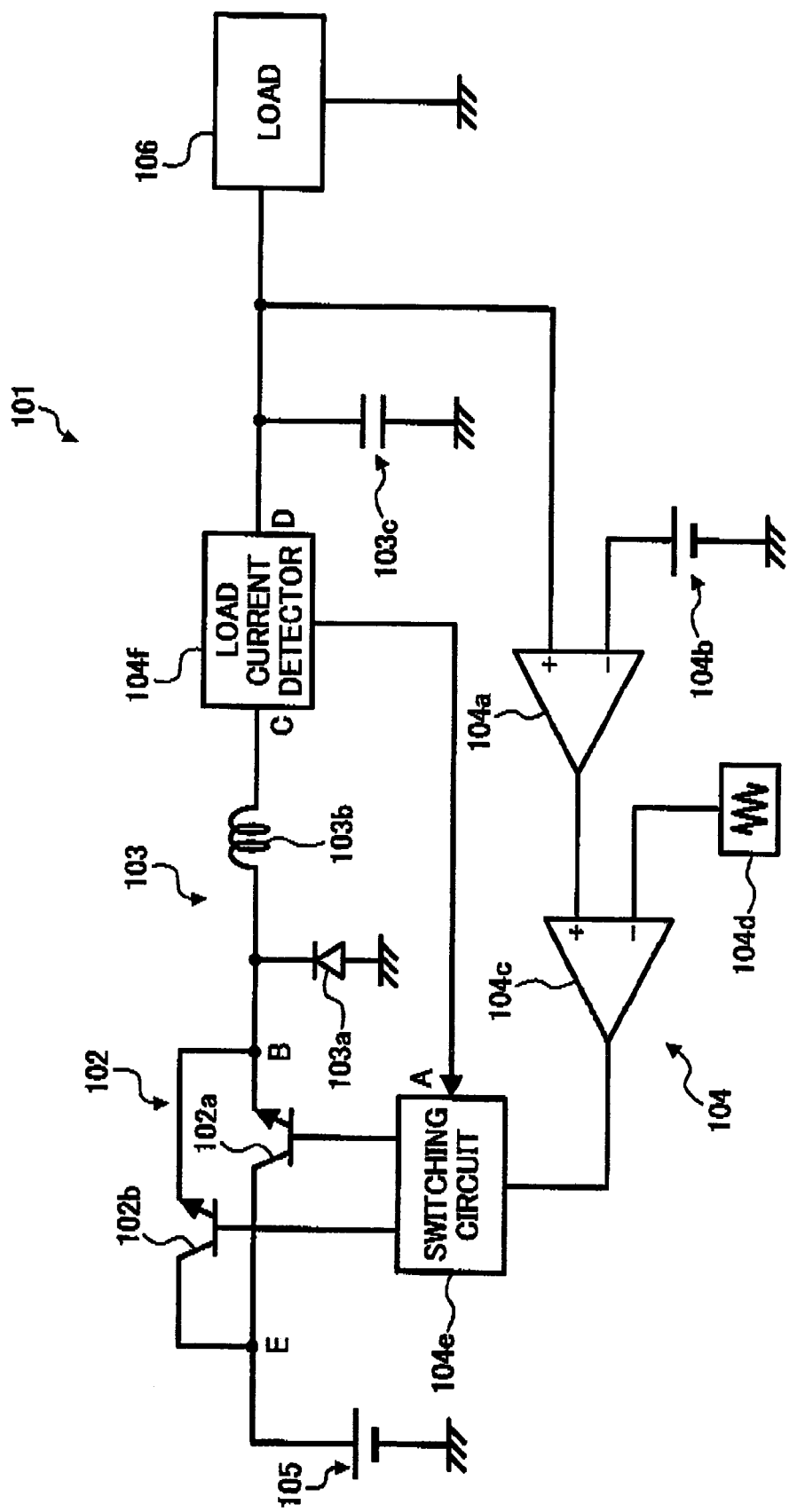
FIG. 1 is a block diagram of a structure of a background switching power supply circuit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present invention are described.

Figure 2:
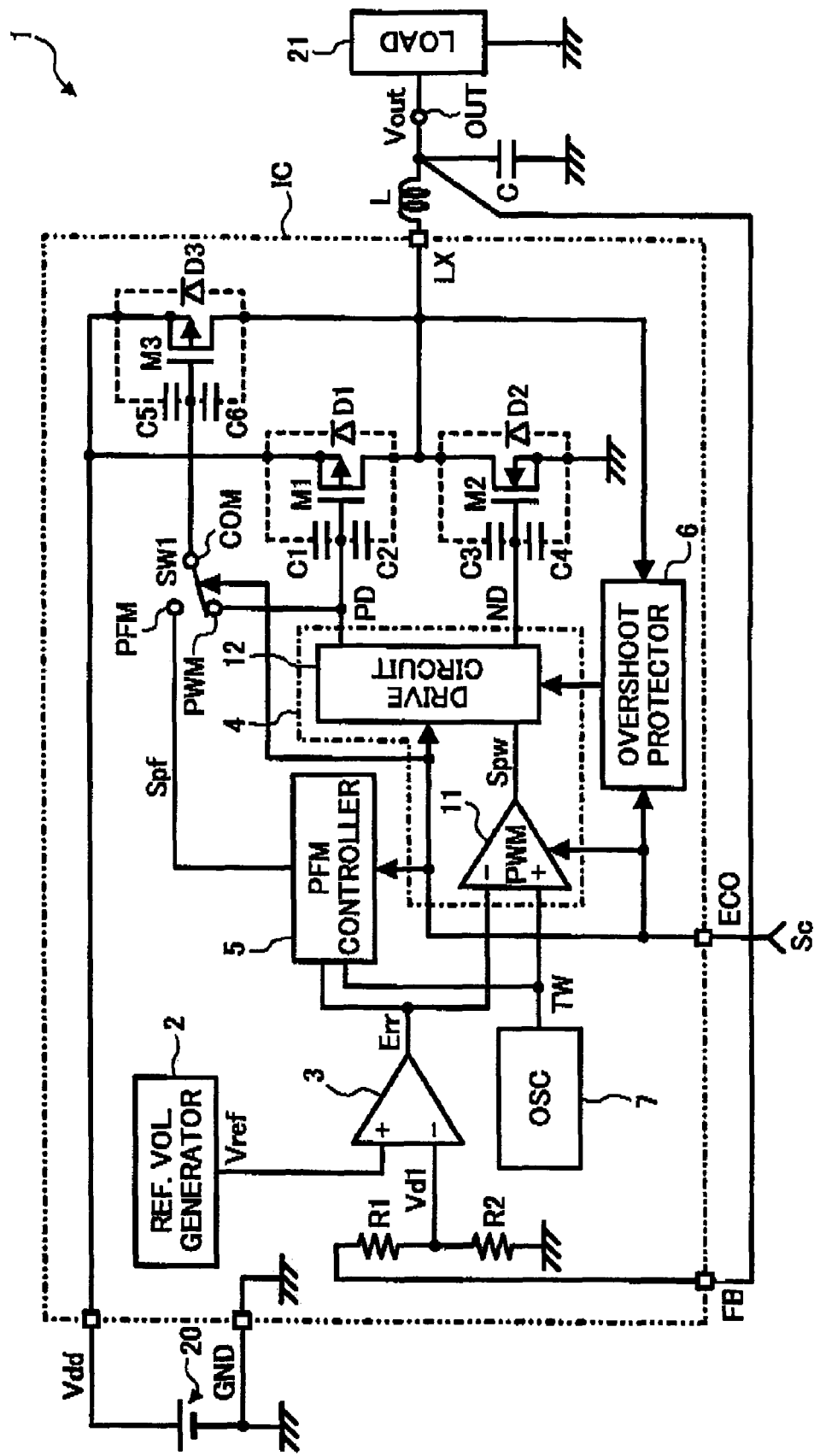
FIG. 2 is a block diagram of a system structure of a switching regulator according to an exemplary embodiment of the present invention.

Referring to FIG. 2, a schematic structure of a switching regulator 1 according to an exemplary embodiment of the present invention is described.

In FIG. 2, the switching regulator 1 includes a first switching transistor M1 as a first switching element, a synchronous rectifying transistor M2 as a synchronous rectification switching element, and a second switching transistor M3 as a second switching element. The switching regulator 1 also includes control circuit components, which are a reference voltage generator 2, an error amplifier 3, a PWM (pulse width modulation) controller 4 as a PWM control unit, a PFM (pulse frequency modulation) controller 5 as a PFM control unit, an oscillator 7 as an oscillating unit, resistors R1 and R2 and a switch SW1 as a switching unit. The switching regulator 1 further includes an overshoot protector 6 as an overshoot protecting unit.

The switching regulator 1 further includes an inductor L and a capacitor C for energy conversion, a direct current power source 20 and an electric load 21.

The first switching transistor M1 is a PMOS (p-channel-type metal oxide semiconductor) transistor performing an output control of an input voltage Vdd that is input to a Vdd terminal serving as an input terminal, and includes parasitic capacitances C1 and C2 and a parasitic diode D1.

The synchronous rectifying transistor M2 is a NMOS (n-channel-type metal oxide semiconductor) transistor and includes parasitic capacitances C3 and C4 and a parasitic diode D2.

The resistors R1 and R2 detecting an output voltage divide a voltage Vout output from an output terminal OUT into a divided voltage Vd1, and output the divided voltage Vd1 to an inverting input end of the error amplifier 3.

The reference voltage generator 2 generates a predetermined reference voltage Vref and outputs the predetermined reference voltage Vref to a non-inverting input end of the error amplifier 3.

The error amplifier 3 compares a voltage of the divided voltage Vd1 with that of the reference voltage Vref, and outputs an output signal Err of a voltage obtained according to a result of the above-described comparison.

The PWM controller 4 performs PWM controls with respect to the first switching transistor M1 and the synchronous rectifying transistor M2 according to the output signal Err output by the error amplifier 3, and performs switching controls of the first switching transistor M1 and the synchronous rectifying transistor M2.

The PWM controller 4 includes a PWM circuit 11 and a drive circuit 12. The PWM circuit 11 generates a pulse signal Spw according to the output signal Err output by the error amplifier 3 and a triangular wave signal TW generated by the oscillator 7, which will be described below. The drive circuit 12 generates a control signal PD for performing the switching controls of the first switching transistor M1 and a control signal ND for performing the switching controls of the synchronous rectifying transistor M2.

The second switching transistor M3 is a PMOS transistor having a size smaller than the first switching transistor M1 and performs an output control of the input voltage Vdd input to the Vdd terminal. The size of the second switching transistor M3 is smaller than the first switching transistor, for example, in a range of from 1/10 to 1/100 of the first switching transistor M1. The second switching transistor M3 includes parasitic capacitances C5 and C6 and a parasitic diode D3.

The PFM controller 5 performs PFM control of the second switching transistor M3 according to the output signal Error output by the error amplifier 3.

The oscillator 7 generates the triangular wave signal TW according to a predetermined frequency and outputs the triangular wave signal TW to the PWM controller 4 and the PFM controller 5.

The switch SW1 receives a switching signal Sc from an external unit. According to the switching signal Sc, requesting operations to switch operation modes, the switch SW1 selects one of the control signal PD output from the PWM controller 4 to a gate of the first switching transistor M1 and a signal Spf output from the PFM controller 5, and outputs the selected signal to a gate of the second switching transistor M3.

The overshoot protector 6 detects a current supplied to the inductor L, determines whether the detected current exceeds a predetermined threshold value. When the detected current exceeds the predetermined threshold value and is determined to be an overshoot, the overshoot protector 6 sends the PWM controller 4 a command to turn off the first switching transistor M1 and the synchronous rectifying transistor M2.

As previously described, the first switching transistor M1 includes the parasitic capacitances C1 and C2 and the parasitic diode D1, the synchronous rectifying transistor M2 includes the parasitic capacitances C3 and C4 and the parasitic diode D2, and the second switching transistor M3 includes the parasitic capacitances C5 and C6 and the parasitic diode D3. While the second switching transistor M3 has a size smaller than the first switching transistor M1, an amount of the parasitic capacitance C5 is smaller than that of the parasitic capacitance C1 and an amount of the parasitic capacitance C6 is smaller than that of the parasitic capacitance C2, accordingly.

In the switching regulator 1, the first switching transistor M1, the synchronous rectifying transistor M2, the second switching transistor M3, the reference voltage generator 2, the error amplifier 3, the PWM controller 4, the PFM controller 5, the overshoot protector 6, the oscillator 7, the resistors R1 and R2, and the switch SW1 are integrated on a single IC (integrated circuit). The above-described single IC includes a plurality of terminals such as a Vdd terminal, a LX terminal, an ECO terminal, a FB terminal, and a GND terminal. The Vdd terminal is configured to be an input terminal of the switching regulator 1. The GND terminal is connected to a ground voltage.

The direct current power source 20 is connected between the Vdd terminal and the GND terminal so that the input voltage Vdd is input from the direct current power source 20 to the IC through the Vdd terminal. The input voltage Vdd is converted to a predetermined voltage and is output from the output terminal OUT. The electric load 21 is connected between the output terminal OUT and a ground voltage. The first and second switching transistors M1 and M3 are connected in parallel between the Vdd terminal and the LX terminal, and the synchronous rectifying transistor M2 is connected between the LX terminal and a ground voltage. The inductor L is connected between the LX terminal and the output terminal OUT, and the capacitor C is connected between the output terminal OUT and a ground voltage. The output terminal OUT that is a connecting point of the inductor L and the capacitor C is connected to the FB terminal. The resistors R1 and R2 forming a series circuit are connected between the FB terminal and a ground voltage.

A connecting point of the resistors R1 and R2 is connected to the inverting input end of the error amplifier 3 to input the divided voltage Vd1 to the error amplifier 3. The reference voltage generator 2 is connected to the non-inverting input end of the error amplifier 3 to input the reference voltage Vref to the error amplifier 3. As previously described, after the error amplifier 3 compares the divided voltage Vd1 and the reference voltage Vref, the output signal Err is output from the error amplifier 3 both to the PFM controller 5 and to the inverting input end of the PWM circuit 11 serving as a comparator. The triangular wave signal TW generated in the oscillator 7 is output both to the PFM controller 5 and to the non-inverting input end of the PWM circuit 11. The pulse signal Spw output from the PWM circuit 11 is output to the drive circuit 12, and the pulse signal Spf output from the PFM controller 5 is output to the PFM terminal of the switch SW1.

The drive circuit 12 outputs the control signal PD that performs switching controls of the first switching transistor M1, to a gate of the first switching transistor M1 and a PWM terminal of the switch SW1. The drive circuit 12 outputs the control signal ND to a gate of the synchronous rectifying transistor M2 to perform switching controls of synchronous rectifying transistor M2. A COM terminal of the switch SW1 is connected to a gate of the second switching transistor M3. The overshoot protector 6 monitors the current to run through the LX terminal and outputs a result of the monitoring, to the drive circuit 12. The switching signal Sc from the external unit is input to the PFM controller 5, the overshoot protector 6, the PWM circuit 11, the drive circuit 12, and the switch SW1, accordingly.

With the above-described structure, the switching signal Sc is sent to switch a normal operation mode and a light load operation mode. The light load operation mode in the switching regulator 1 of FIG. 2 needs a lesser amount of current than an amount of current in the normal operation mode. As previously shown in the background switching power supply circuit 101 of FIG. 1, the switching signal Sc may be output to switch to the light load operation mode when a load current is determined to become equal to or less than a predetermined level of a predetermined current. The switching signal Sc may also be output when a control circuit (not shown) controlling an apparatus including the switching regulator 1 changes to a light load operation mode such as a standby mode.

Operations of the above-described switching regulator 1 when the switching signal Sc selects the normal operation mode are described.

When the normal operation mode is selected, the PFM controller 5 stops its operation and controls an amount of a current to be consumed therein to become zero or minimum, and the overshoot protector 6, the PWM circuit 11 and the drive circuit 12 are activated. Accordingly, the switching regulator 1 operates as a switching regulator using a synchronous rectification method. Further, the switch SW1 selects the PWM terminal to connect the COM terminal to the PWM terminal, so that the control signal PD output by the drive circuit 12 may be output to the gate of the second switching transistor M3.

Then, the first and second switching transistors M1 and M3 respectively perform the switching operations, so that a current may be supplied to the inductor L when the first and second switching transistors M1 and M3 are turned on. At this time, the synchronous rectifying transistor M2 remains inactive. When the first and second switching transistors M1 and M3 are respectively turned off, the synchronous rectifying transistor M2 turns on, and the energy stored in the inductor L is discharged through the synchronous rectifying transistor M2. The current generated according to the above-described operation is smoothed by the capacitor C and is output to the electric load 21 through the output terminal OUT.

The output voltage Vout output by the output terminal OUT is divided into the divided voltage Vd1 by the resistors R1 and R2, and the divided voltage Vd1 is input to the inverting input end of the error amplifier 3 while the reference voltage Vref is input to the non-inverting input end of the error amplifier 3. The divided voltage Vd1 and the reference voltage Vref are compared in the error amplifier 3, and the difference of these voltages is amplified in the error amplifier 3 and is output to the inverting input end of the PWM circuit 11 as the output signal Err. The triangular wave signal TW is input from the oscillator 7 to the non-inverting input end of the PWM circuit 11. The PWM circuit 11 performs the PWM controls of the output signal Err and the triangular wave signal TW to generate the pulse signal Spw so that the pulse signal Spw may be output to the drive circuit 12.

When the output voltage Vout of the switching regulator 1 becomes higher, the voltage of the output signal Err of the error amplifier 3 becomes lower and a duty cycle of the pulse signal Spw of the PWM circuit 11 becomes smaller. Consequently, the switching regulator 1 may be controlled such that periods of time the first and second switching transistors M1 and M3 turn on become shorter and the output voltage Vout of the switching regulator 1 becomes lower. When the output voltage Vout of the switching regulator 1 becomes lower, opposite actions of the above-described operations may be performed to stabilize the output voltage Vout of the switching regulator 1.

The overshoot protector 6 compares a predetermined voltage with a voltage drop of respective first and second switching transistors M1 and M3 while the first and second switching transistors M1 and M3 turn on. When the voltage drop exceeds a level of the predetermined voltage, a predetermined signal is output to stop the drive circuit 12. When the drive circuit 12 stops it operation, a level of the control signal PD becomes high and that of the control signal ND becomes low, and the first and second switching resistors M1, M3 and the synchronous rectifying transistor M2 are turned off. Accordingly, the output current supplied from the output terminal OUT is stopped.

Subsequently, operations of the above-described switching regulator 1 when the switching signal Sc selects the light load operation mode are described.

When the light load operation mode is selected, the switching regulator 1 activates the PFM controller 5, terminates the PWM circuit 11, the drive circuit 12 and the overshoot protector 6, and controls respective amounts of currents to be consumed in the PWM circuit 11 and the drive circuit 12 to become zero or minimum. The switch SW1 selects the PFM terminal to connect the COM terminal to the PFM terminal so that the pulse signal Spf output by the PFM controller 5 may be output to the gate of the second switching transistor M3. The second switching transistor M3 performs the switching operation according to the pulse signal Spf output by the PFM controller 5. Since the drive circuit 12 stops its operation at this time, the synchronous rectifying transistor M2 remains inactive. Accordingly, the energy stored in the inductor L is discharged through the diode D2 that is parasitic between the source and drain of the synchronous rectifying transistor M2. At this time, the diode D2 works as a flywheel diode.

Figure 3:
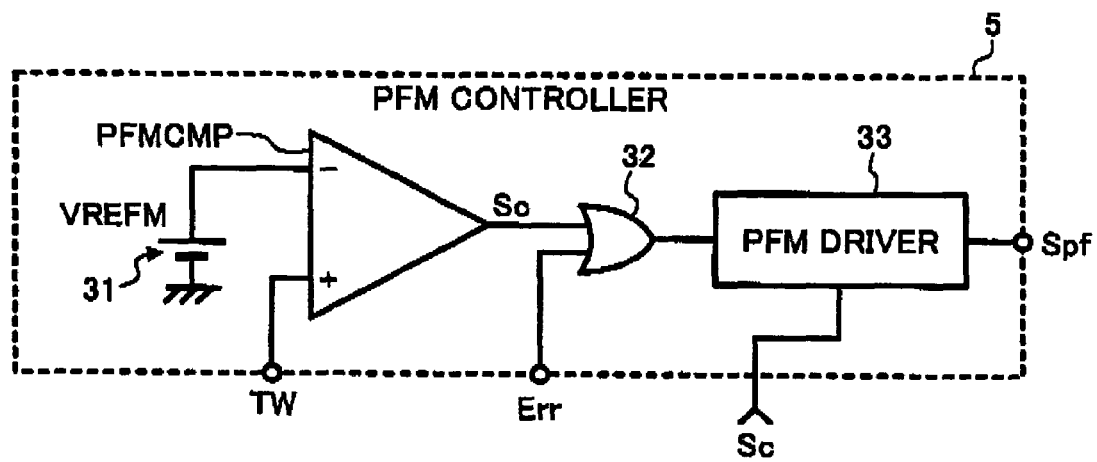
FIG. 3 is a detailed structure of a PFM (pulse frequency modulation) controller of the switching regulator of FIG. 2.
Figure 4:
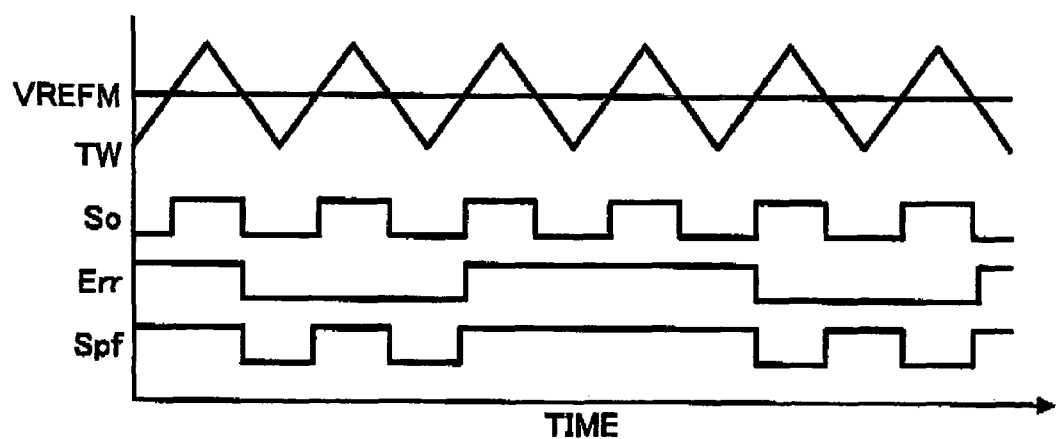
FIG. 4 is a timing chart showing waveforms of a triangular wave signal TW, a reference voltage VREFM, an output signal So, an output signal Err and a pulse signal Spf of the switching regulator of FIG. 2.

Referring now to FIGS. 3 and 4, details of the PFM controller 5 are described.

FIG. 3 is a detailed structure of the PFM controller 5, and FIG. 4 is a timing chart showing waveforms of respective components of the PFM controller 5 of FIG. 3. The waveforms of FIG. 4 are arranged in a time-based format so that differences of the waveforms can be shown.

In FIG. 3, the PFM controller 5 includes a reference voltage generator 31, voltage comparator PFMCMP, an OR circuit 32, and a PFM drive circuit 33.

The reference voltage generator 31 generates and outputs a predetermined reference voltage VREFM.

The voltage comparator PFMCMP has two input ends, which are a non-inverting input end and an inverting input end, and an output end. The voltage comparator PFMCMP compares the reference voltage VREFM and a voltage of the triangular wave signal TW, and outputs an output signal So. The triangular wave signal TW is input to the non-inverting input end of the voltage comparing circuit PFMCMP and the reference voltage VREFM is input to the inverting input end of the voltage comparator PFMCMP. The output signal So is output from the output end of the voltage comparator PFMCMP. The output end of the voltage comparator PFMCMP is connected to one of two input ends of the OR circuit 32. The other input end of the OR circuit 32 is connected to the error amplifier 3 to receive the output signal Err. An output signal output from the OR circuit 32 is input to the PFM drive circuit 33. The PFM drive circuit 33 further receives the switching signal Sc, and outputs the pulse signal Spf from the PFM drive circuit 33.

As shown in FIG. 4, the reference voltage VREFM is set to a mean voltage between upper and lower limits of a triangular wave pulse of the triangular wave signal TW. Accordingly, the output signal So output from the voltage comparator PFMCMP has a pulse train forming a rectangular wave. In the light load operation mode, the error amplifier 3 does not perform a linear operation with respect to the PWM circuit 11. That is, the error amplifier 3 operates as a comparator in the light load operation mode to output two different binary signals, which are a high level signal and a low level signal, as shown in FIG. 4. The high and low signals control the gate of the OR circuit 32 to selectively obtain an output pulse of the voltage comparator PFMCMP, as shown in a pulse train of the pulse signal Spf of FIG. 4.

The pulse signal Spf selectively obtained by the OR circuit 32 is output through the PFM drive circuit 33 to the gate of the second switching transistor M3 selectively connected by the switch SW1, so that the switching control of the second switching transistor M3 may be controlled. Since the switching signal Sc is previously input to the PFM drive circuit 33, the PFM drive circuit 33 stops its operation and controls an amount of a current to be consumed in the PFM drive circuit 33 to become zero or minimum in the normal operation mode.

Figure 5:
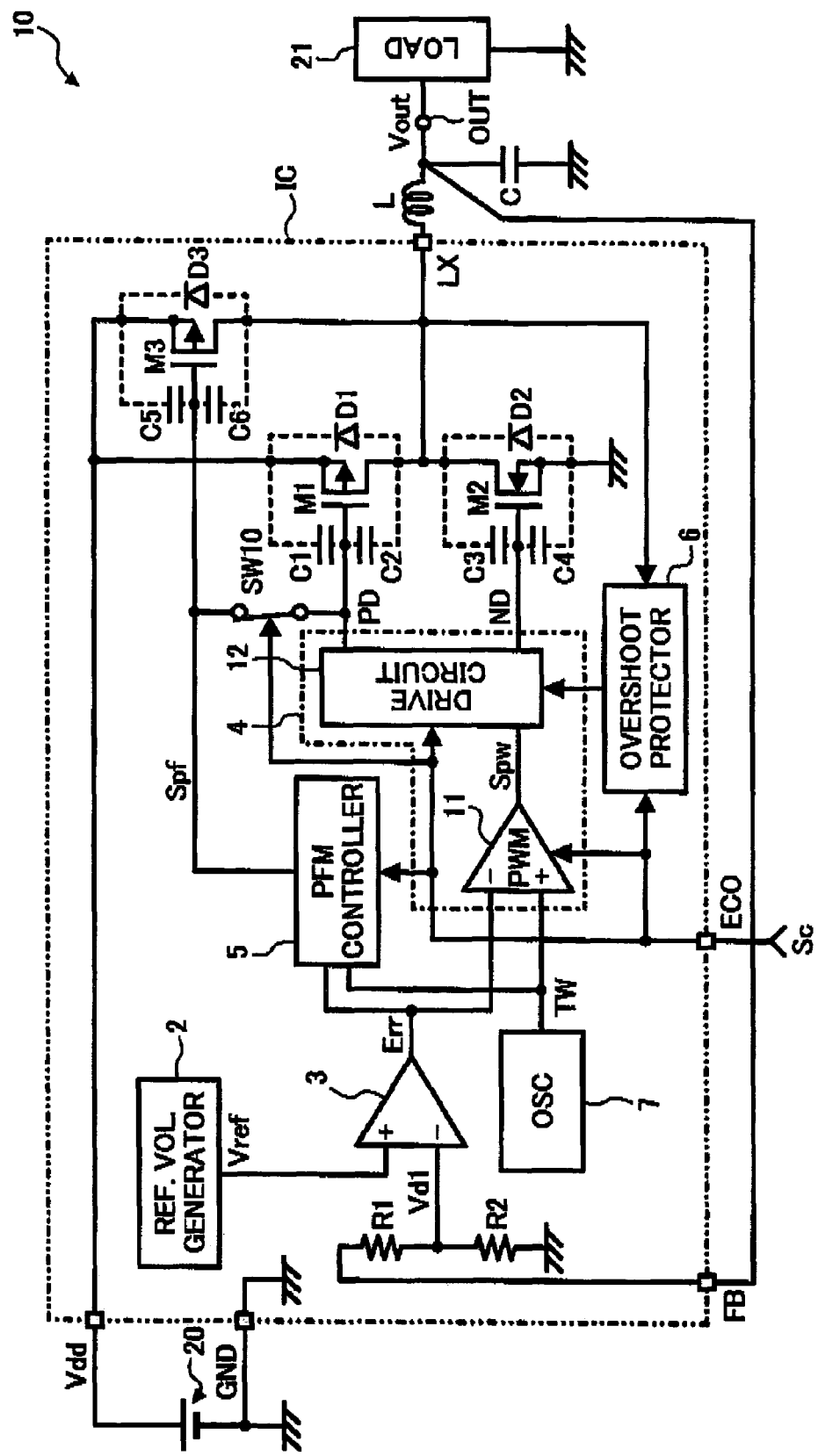
FIG. 5 is a block diagram of a system structure of a switching regulator according to an alternative exemplary embodiment of the present invention.

Referring to FIG. 5, a structure of the switching regulator 10 is described.

As previously shown in FIG. 2, the pulse signal Spf generated by the PFM controller 5 is controlled by the switch SW1 when the pulse signal Spf is output to the gate of the second switching transistor M3. As an alternative, the pulse signal Spf may be controlled by the PFM controller 5 according to the switching signal Sc when the pulse signal Spf is output to the gate of the second switching transistor M3. FIG. 5 shows the structure having the above-described function, replacing the structure of FIG. 2. Components of the switching regulator 10 shown in FIG. 5 are functionally identical to those of the switching regulator 1 shown in FIG. 2, except for operation of a switch SW10.

In FIG. 5, the switch SW10 determines whether the pulse signal Spf output by the PFM controller 5 or the control signal PD is input to the gate of the second switching transistor M3.

With the above-described structure, when the switching signal Sc indicates the normal operation mode, the PFM controller 5 keeps a status of its output end at high impedance so as to output the pulse signal Spf and the switch SW10 is turned on so as to input the control signal PD output by the drive circuit 12 to the gate of the second switching transistor M3. Accordingly, the second switching transistor M3 performs its switching operation according to the control signal PD output from the drive circuit 12.

When the switching signal Sc indicates the light load operation mode, the PFM controller 5 outputs the pulse signal Spf to the gate of the second switching transistor M3 and the switch SW10 is turned off so as to prevent the control signal PD from being input to the second switching transistor M3. Accordingly, the second switching transistor M3 performs its switching operation according to the pulse signal Spf of the PFM controller 5.

Figure 6:
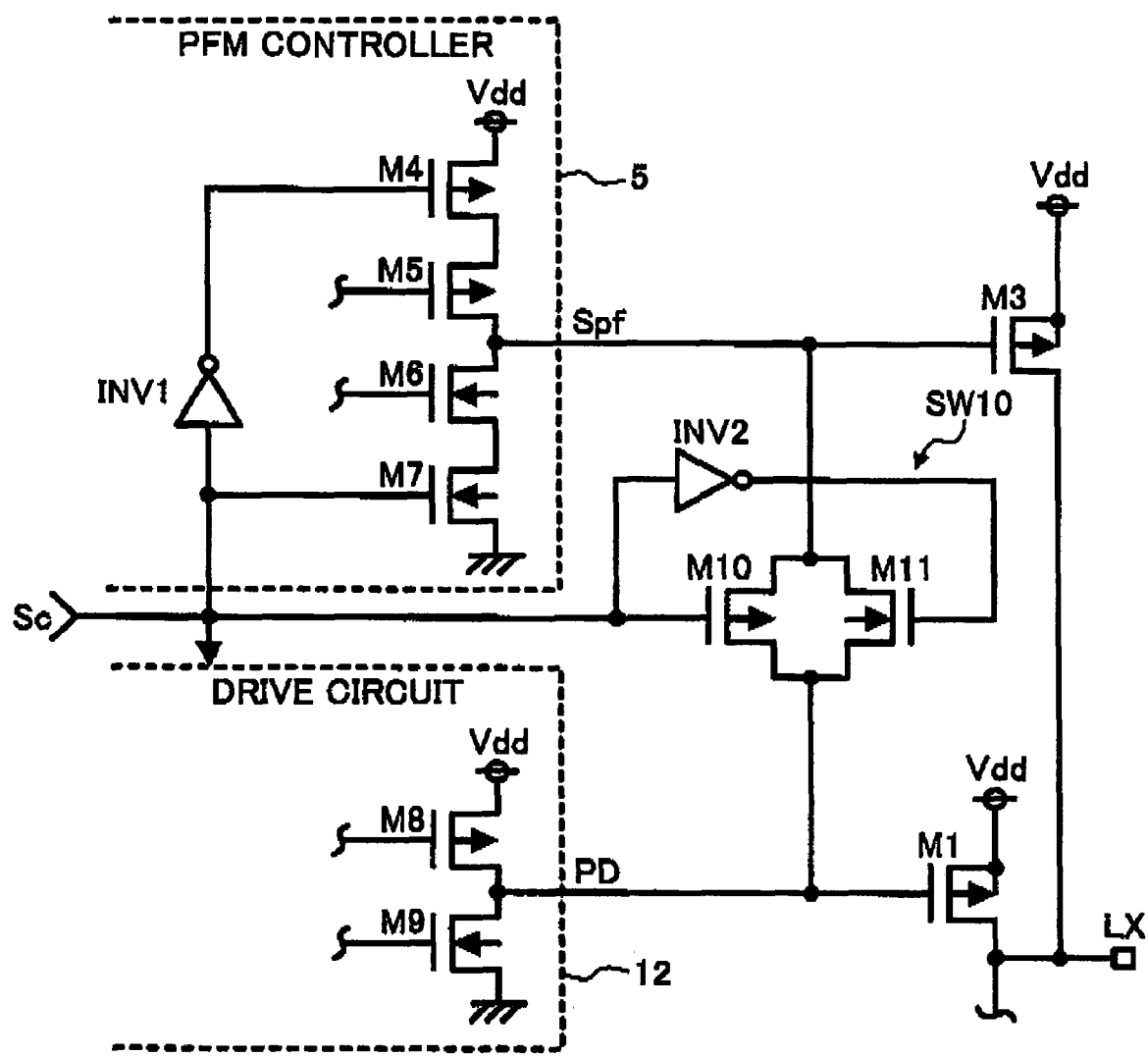
FIG. 6 is a block diagram of a detailed structure of the PFM controller, a drive circuit and a switch of the switching regulator of FIG. 5.

Referring to FIG. 6, a structure of output circuits of the PFM controller 5 and the drive circuit 12, and a circuit of the switch SW10 of FIG. 5 is described.

In FIG. 6, the output circuits of the PFM controller 5 include PMOS transistors M4 and M5 and NMOS transistors M6 and M7, and are serially arranged between the input voltage Vdd and a ground voltage of the PFM controller 5. The PFM controller 5 also includes an inverter INV1 to invert signals to be input thereto. The switching signal Sc is input to a gate of the PMOS transistor M4 after the switching signal Sc is inverted in the inverter INV1 and to a gate of the NMOS transistor M7 without any inversion being performed. The pulse signal Spf is output by the PMOS transistor M5 and the NMOS transistor M6. Detailed circuits connected to respective gates of the PMOS transistor M5 and the NMOS transistor M6 are not shown in FIG. 6.

The output circuits of the drive circuit 12 include a PMOS transistor M8 and a NMOS transistor M9, and are serially arranged between the input voltage Vdd and a ground voltage of the drive circuit 12.

The switch SW10 forms a transmission gate including a PMOS transistor M10, NMOS transistor M11 and an inverter INV2, and are arranged in parallel with each other between the gate of the second switching transistor M3 and the output end of the drive circuit 12. The switching signal Sc is input to a gate of the PMOS transistor M10 without any inversion performed and to a gate of the NMOS transistor M11 after the switching signal Sc is inverted in the inverter INV2.

With the above-described structure, when the switch signal Sc becomes a high level to change to the operation mode to the light load operation mode, the PMOS transistor M4 and the NMOS transistor M7 of the PFM controller 5 are turned on to output the pulse signal Spf to the gate of the second switching transistor M3, the PWM circuit 11 stops outputting the pulse signal Spw, and the drive circuit 12 stops outputting the control signals PD and ND. At the same time, the PMOS transistor M10 and NMOS transistor M11 of the switch SW10 are respectively turned off. Consequently, the first switching transistor M1 is turned off and, as a result, the second switching transistor M3 solely controls the switching operations according to the pulse signal Spf output by the PFM controller 5. At this time, the synchronous rectifying transistor M2 is turned off to become inactive.

When the switching signal Sc becomes a low level to change the operation mode to the normal operation mode, the PMOS transistor M4 and the NMOS transistor M7 of the PFM controller 5 are turned off to stop outputting the pulse signal Spf, and the drive circuit 12 outputs the control signal PD to the gate of the first switching transistor M1. At the same time, the PMOS transistor M10 and the NMOS transistor M11 of the switch SW1 are respectively turned on. The pulse signal PD output by the drive circuit 12 is sent to respective gates of the first and second switching transistors M1 and M3. Therefore, the first and second switching transistors M1 and M3 perform respective switching operations according to the control signal PD of the drive circuit 12.

As previously described, the power consumptions occurring in the light load operation are caused by the power loss according to a current flowing in the first switching transistor M1, the charging and discharging operations of the parasitic capacitances existing in the first switching transistor M1 according to the control signal PD output by the drive circuit 12, and so forth. When a large amount of current flows into the electric load 21, a large amount of power in the switching regulator 1 may be lost due to the current flowing in the first switching transistor M1. Actually, the amount of power loss may vary in proportion to the square of the amount of current flowing into the electric load 21. That is, the amount of power loss may sharply drop when the amount of current going into the electric load 21 decreases. Accordingly, a small amount of current going into the electric load 21 in the light load operation mode may be ignored.

The power consumption due to the charging and discharging operations of the parasitic capacitances existing in the first switching transistor M1 has been different from the above-described power consumption. The power consumption due to the parasitic capacitances depends upon the product of an amount of the parasitic capacitances and the voltage applied to the parasitic capacitances, and does not depend upon the current in the electric load 21. When the current in the electric load 21 decreases, the input voltage Vdd, then the voltage applied to the parasitic capacitances, may become higher, and the amount of power loss due to the parasitic capacitances existing in the first switching transistor M1 may increase.

The switching regulator 1 according to the present invention may reduce the power loss caused by the parasitic capacitances by using the second switching transistor M3 while the first switching transistor M1 is turned off in the light load operation mode. The second switching transistor M3 has a significantly small amount of parasitic capacitances existing between the gate and the source and between the gate and the drain of the second switching transistor M3.

The smaller the size of a switching transistor becomes, the less an amount of a parasitic capacitance of the switching transistor. Therefore, when a small amount of a parasitic capacitance is desired, a switching transistor may be made small in size. An amount of a current going to the load 21 in the standby mode is generally in a range from some μA to some hundred μA, which is smaller than an amount of current in the normal operation mode by two to five orders of magnitude. Since the switching transistor can be made smaller in proportion to the current going to the load 21, an amount of the parasitic capacitance may also be reduced by two to five orders of magnitude.

When the size of the second switching transistor M3 is made smaller, the second switching transistor M3 may have a higher impedance when it is activated, resulting in a large amount of power loss due to the current in the second switching transistor M3. However, since an amount of current going into the electric load 21 is small, the increase in the amount of power loss due to the current in the second switching transistor M3 is negligible when it is compared to the amount of power loss due to the charge and discharge operations of the parasitic capacitances existing in the second switching transistor M3.

Further, the number of switching operations of the second switching transistor M3 is reduced and the switching operations of the synchronous rectifying transistor M2 is stopped in the light load operation mode of the switching regulator 1 of the present invention. Accordingly, the amount of power loss may further be reduced.

Since the impedance of the second switching transistor M3 becomes high in the light load operation mode, a significant amount of current may not go into the electric load 21 even when the electric load 21 causes a short circuit. Therefore, the overshoot protector 6 may be turned off in the light load operation mode to cut the current used in the overshoot protector 6.

Further, the first and second switching transistors M1 and M3 simultaneously perform the respective switching operations in the normal operation mode, thereby the size of the first switching transistor M1 may be made smaller. That is, a chip size of the switching regulator 1 may not become larger even when the second switching transistor M3 is added. This may exert a great effect on a recent trend in which both an amount of power consumption in the light load operation mode and a size of the second switching transistor M3 become larger than ever.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. A switching regulator, comprising:
    a first switching element configured to perform a switching operation in accordance with a first control signal input thereto to control an output voltage based on an input voltage;
    a second switching element having a size smaller than the first switching element and configured to perform a switching operation in accordance with one of the first control signal and a second control signal input thereto to control an output voltage based on the input voltage, the second switching element selectively receiving the first and second control signals; and
    a control circuit configured to control the first and second switching elements to perform the switching operations in one of a normal operation mode and a light load operation mode in which a current consumed by a load connected to the switching regulator is smaller than a current consumed in the normal operation mode, and control the first switching element to be turned off in the light load operation mode.

2. The switching regulator according to claim 1, wherein the second switching element produces between electrodes thereof parasitic capacitances smaller than parasitic capacitances of the first switching element, and has an impedance higher than an impedance of the first switching element when the second switching element is turned on.

3. The switching regulator according to claim 2, wherein the control circuit controls the first and second switching elements to be turned on together in the normal operation mode.

4. The switching regulator according to claim 2, further comprising:
    an inductor configured to store an energy generated by a current flowing through the inductor and associated with the output voltage supplied by the first and second switching elements; and
    a third switching element having a parasitic diode between input and output electrodes thereof, serially connected with the first switching element, and configured to discharge the energy stored in the inductor,
    wherein the control circuit controls the third switching element to perform a reverse operation relative to the switching operation of the first switching element in the normal operation mode, and to be turned off together with the first switching element to cause the parasitic diode to act as a flywheel diode in the light load operation mode.

5. The switching regulator according to claim 4, further comprising:
    an overshoot protecting circuit configured to detect the current flowing through the first and second switching elements, to cause the control circuit to turn off the first switching element when the current exceeds a threshold value, and to terminate in the light load operation mode.

6. The switching regulator according to claim 5, wherein the control circuit comprises:
    a first modulation controller configured to perform pulse width modulation control with respect to the first and third switching elements;
    a second modulation controller configured to perform pulse frequency modulation control with respect to the second switching element; and a first switching circuit configured to select one of the first control signal derived from the first modulation controller to change the operation mode to the normal operation mode and the second control signal derived from the second modulation controller to change the operation mode to the light load operation mode, so as to be output to the second switching element.

7. The switching regulator according to claim 6, wherein the second modulation controller is configured to activate in the light load operation mode and to terminate in the normal operation mode.

8. The switching regulator according to claim 6, wherein the first modulation controller is configured to activate in the normal operation mode and to terminate in the light load operation mode.

9. The switching regulator according to claim 8, further comprising:
a first oscillating circuit configured to generate a pulse signal according to a predetermined frequency,
wherein the second modulation controller generates a predetermined pulse, during the pulse width modulation control, based on a pulse train output by the first oscillating circuit in accordance with the predetermined voltage output to the electric load, and outputs the predetermined pulse to the second switching element.

10. The switching regulator according to claim 6, wherein the first and second switching elements and the control circuit are integrated into a single integrated circuit.

11. The switching regulator according to claim 6, wherein the first and second switching elements, the control circuit and the overshoot protecting circuit are integrated into a single integrated circuit.

12. The switching regulator according to claim 5, wherein the control circuit comprises:
a third modulation controller configured to perform pulse width modulation control with respect to the first and third switching elements;
a fourth modulation controller configured to perform pulse frequency modulation control with respect to the second switching element in the light load operation mode and to stop the pulse frequency modulation control in the normal operation mode; and
a second switching circuit configured to determine whether a control signal derived from the third modulation controller is output to the second switching element in the normal operation mode.

13. The switching regulator according to claim 12, wherein the third modulation controller is configured to activate in the normal operation mode and to terminate in the light load operation mode.

14. The switching regulator according to claim 13, further comprising:
a second oscillating circuit configured to generate a pulse signal according to a predetermined frequency,
wherein the fourth modulation controller generates a predetermined pulse, during the pulse width modulation control, based on a pulse train output by the second oscillating circuit in accordance with the predetermined voltage output to the load, and outputs the predetermined pulse to the second switching element.

15. The switching regulator according to claim 12, wherein the first and second switching elements and the control circuit are integrated into a single integrated circuit.

16. The switching regulator according to claim 12, wherein the first and second switching elements, the control circuit and the overshoot protecting circuit are integrated into a single integrated circuit.

17. A switching regulator, comprising:
first means for performing a switching operation in accordance with a first control signal input thereto to control an output voltage based on an input voltage;
second means for performing having a size smaller than the first means for performing and for performing the switching operation in accordance with one of the first control signal and a second control signal input thereto to control an output voltage based on the input voltage, the second means for performing selectively receiving the first and second control signals; and
means for controlling of the first and second means for performing to perform the switching operations in one of a normal operation mode and a light load operation mode in which a current consumed by a load connected to the switching regulator is smaller than a current consumed in the normal operation mode, and to control the first means for performing to be turned off in the light load operation mode.

18. The switching regulator according to claim 17, wherein the second means for performing produces between electrodes thereof parasitic capacitances smaller than parasitic capacitances of the first means for performing, and has an impedance higher than an impedance of the first means for performing when the second means for performing is turned on.

19. The switching regulator according to claim 18, wherein the means for controlling controls the first and second means for performing to be turned on together in the normal operation mode.

20. The switching regulator according to claim 18, further comprising:
means for storing an energy generated by a current flowing through the means for storing and associated with the output voltage supplied by the first and second means for performing; and
third means for performing having a parasitic diode between input and output electrodes thereof, serially connected with the first means for performing, and for switching to discharge the energy stored in the means for storing,
wherein the means for controlling controls the third means for performing to perform a reverse operation relative to the switching operation of the first means for performing in the normal operation mode, and to be turned off together with the first means for performing and to cause the parasitic diode to act as a flywheel diode in the light load operation mode.

21. The switching regulator according to claim 20, further comprising:
means for detecting the current flowing through the first and second means for performing, for causing the means for controlling to turn off the first means for performing when the current exceeds a threshold value, and for terminating in the light load operation mode.

22. The switching regulator according to claim 21, wherein the means for controlling comprises:
first means for operating a pulse width modulation control with respect to the first and third means for performing;
second means for operating a pulse frequency modulation control with respect to the second means for performing; and
means for selecting one of the first control signal derived from the first means for operating to change the operation mode to the normal operation mode and the second control signal derived from the second means for operating to change the operation mode to the light load operation mode, so as to be output to the second means for performing.

23. The switching regulator according to claim 22, wherein the second means for operating is configured to activate in the light load operation mode and to terminate in the normal operation mode.

24. The switching regulator according to claim 22, wherein the first means for operating is configured to activate in the normal operation mode and to terminate in the light load operation mode.

25. The switching regulator according to claim 24, further comprising:
   first means for generating a pulse signal according to a predetermined frequency,
   wherein the second means for operating generates a predetermined pulse, during the pulse width modulation control, based on a pulse train output by the first means for generating in accordance with the predetermined voltage output to the means for receiving, and outputs the predetermined pulse to the second means for performing.

26. The switching regulator according to claim 22, wherein the first and second means for performing and the means for controlling are integrated into a single integrated circuit.

27. The switching regulator according to claim 22, wherein the first and second means for performing, the means for controlling and the means for detecting are integrated into a single integrated circuit.

28. The switching regulator according to claim 21, wherein the means for controlling comprises:
   third means for operating a pulse width modulation control with respect to the first and third means for performing;
   fourth means for operating a pulse frequency modulation control with respect to the second means for performing in the light load operation mode and for stopping the pulse frequency modulation control in the normal operation mode; and
   means for determining whether a control signal derived from the third means for operating is output to the second means for performing in the normal operation mode.

29. The switching regulator according to claim 28, wherein the third means for operating is configured to activate in the normal operation mode and to terminate in the light load operation mode.

30. The switching regulator according to claim 29, further comprising:
   second means for generating a pulse signal according to a predetermined frequency,
   wherein the fourth means for operating generates a predetermined pulse, during the pulse width modulation control, based on a pulse train output by the second means for generating in accordance with the predetermined voltage output to the means for receiving, and outputs the predetermined pulse to the second means for performing.

31. The switching regulator according to claim 28, wherein the first and second means for performing and the means for controlling are integrated into a single integrated circuit.

32. The switching regulator according to claim 28, wherein the first and second means for performing, the means for controlling and the means for detecting are integrated into a single integrated circuit.

33. A method of switching, comprising the steps of:
   providing a first switching element in a switching regulator;
   providing a second switching element having a size smaller than the first switching element, in the switching regulator;
   receiving a switching signal;
   generating first and second control signals in accordance with the switching signal;
   sending the first control signal to the first switching element;
   selectively sending the first and second control signals to the second switching element;
   controlling the first switching element to be turned off when a light load operation mode is selected; and
   controlling the second switching element to be turned on when the light load operation modes are selected.

34. The method according to claim 33, wherein the controlling step controls the first and second switching elements to be turned on in a normal operation mode.

35. The method according to claim 34, further comprising the steps of:
   storing an energy generated by a current flowing by the storing and associated with an output voltage supplied by the first and second switching elements;
   providing a third switching element having a parasitic diode between input and output electrodes thereof; and
   controlling the third switching element to perform a reverse operation relative to the switching operation of the first switching element in the normal operation mode and to be turned off together with the first switching element to cause the parasitic diode to act as a flywheel diode in the light load operation mode.

36. The method according to claim 35, further comprising the steps of:
   detecting the current supplied by the first and second switching elements; and
   causing the first switching element to be turned off when the current exceeds a threshold value in the normal operation mode.

37. The method according to claim 36, wherein the causing step is terminated in the light load operation mode.

38. The method according to claim 37, wherein the generating step comprises the steps of:
   performing pulse width modulation control with respect to the first and third switching elements;
   conducting pulse frequency modulation control with respect to the second switching element; and
   allowing the control signal sent by the sending step to pass through a selectable gate to the second switching element.

39. The method according to claim 38, wherein the conducting step activates in the light load operation mode and terminates in the normal operation mode.

40. The method according to claim 38, wherein the performing step activates in the normal operation mode and terminates in the light load operation mode.

41. The method according to claim 40, further comprising the step of:
   forming a pulse signal according to a predetermined frequency,
   wherein the conducting step generates a predetermined pulse, during the pulse width modulation control, based on a pulse train output by the forming step, and outputs the predetermined pulse to the second switching element.

42. The method according to claim 37, wherein the generating step comprises the steps of:
- performing pulse width modulation control with respect to the first and third switching elements;
- conducting pulse frequency modulation control with respect to the second switching element in the light load operation mode;
- terminating the pulse frequency modulation control in the normal operation mode; and
- determining the control signal derived from the performing step is output to the second switching element in the normal operation mode.

43. The method according to claim 42, wherein the performing step activates in the normal operation mode and terminates in the light load operation mode.

44. The method according to claim 43, further comprising the step of:
- forming a pulse signal according to a predetermined frequency,
- wherein the conducting step generates a predetermined pulse, during the pulse width modulation control, based on a pulse train output by the forming step, and outputs the predetermined pulse to the second switching element.

45. A power supply method, comprising the steps of:
- providing a first switching element;
- providing a second switching element having a size smaller than the first switching element;
- receiving a mode selection signal;
- changing an operation mode to one of a normal operation mode and a light load operation mode in accordance with the mode selection signal;
- generating a first control signal in accordance with the mode selection signal;
- generating a second control signal in accordance with the mode selection signal;
- sending the first control signal to the first and second switching elements in the normal operation mode;
- sending the second control signal to the second switching element in the light load operation mode;
- detecting an output signal derived from outputs of the first and second switching elements in the normal operation mode and the light load operation mode;
- comparing the output signal with a reference signal; and
- adjusting the outputs of the first and second switching elements according to a result of the comparison.

* * * * *